Aug. 18, 1953 M. W. PHILLIPS 2,649,487
IMMERSION HEATER FOR BUSHING FOR
FIBER GLASS MANUFACTURE

Filed July 27, 1949 2 Sheets-Sheet 1

INVENTOR.
Marion W. Phillips
BY
ATTORNEY.

Aug. 18, 1953  M. W. PHILLIPS  2,649,487
IMMERSION HEATER FOR BUSHING FOR
FIBER GLASS MANUFACTURE

Filed July 27, 1949  2 Sheets-Sheet 2

INVENTOR.
Marion W. Phillips
BY
ATTORNEY.

Patented Aug. 18, 1953

2,649,487

UNITED STATES PATENT OFFICE 2,649,487

IMMERSION HEATER FOR BUSHING FOR FIBER GLASS MANUFACTURE

Marion W. Phillips, Kansas City, Kans., assignor to Gustin-Bacon Manufacturing Company, a corporation of Missouri Application July 27, 1949, Serial No. 107,095

14 Claims. (Cl. 13—6)

This invention relates to improvements in the production of glass fiber or filaments and refers more particularly to an improved method and apparatus for melting glass in the manufacture of fiber glass.

In my copending application, Serial No. 98,694 filed June 13, 1949, there is disclosed the use of an open top platinum vessel or bushing having orifices in the bottom through which molten glass issues and is drawn into fine filaments. Melting the glass is accomplished in the apparatus shown in this earlier application by connecting electrical power lines directly to lugs or terminals on opposite ends of the bushing and utilizing the walls of the bushing as the electrical resistance thus providing the heat to melt the glass. This type heating arrangement requires high current loads up to 5500 amperes to generate sufficient heat to melt glass contained in the bushing and does not lend itself particularly to the removal of occluded gases in the glass which are the cause of frequent fiber breakage. Another objection to utilizing the walls of the bushing as the heating element is a tendency of the platinum to sublimate as a result of the intense heat required to maintain the glass in a molten condition producing thin spots in the walls of the bushing reducing the electrical resistance and causing uneven heating of the glass body. These local hot spots produced by sublimation of the metal are undesirable since uniformity of temperature is of prime importance in the manufacture of fiber glass.

An object, therefore, of the instant invention is to eliminate in so far as possible some of these disadvantages.

Among the salient objects is to provide an immersion heater which supplies heat to the glass body uniformly throughout the bushing with a minimum of current consumption.

A further object is to provide a structure wherein the loops or convolutions of wire which serve as a heating element resemble a catenary permitting the wire to hang in the glass body with the least possible deformation when softened by the intense heat.

Another object is to provide a structure which minimizes the heat loss occurring where high temperatures such as those necessary to melt glass are used.

Other objects and features of novelty will appear from the description which follows.

Figure 1:
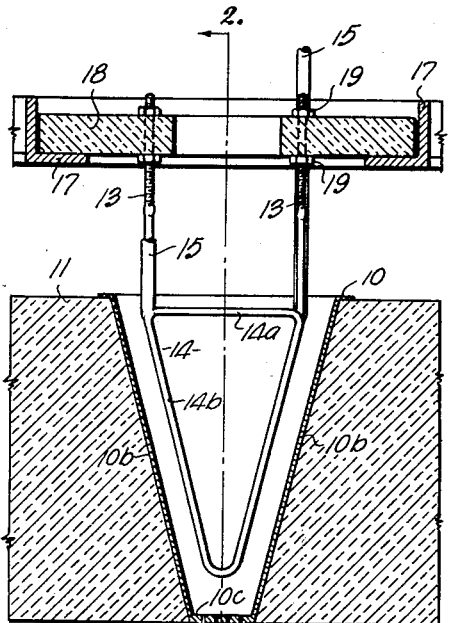
Figure 2:
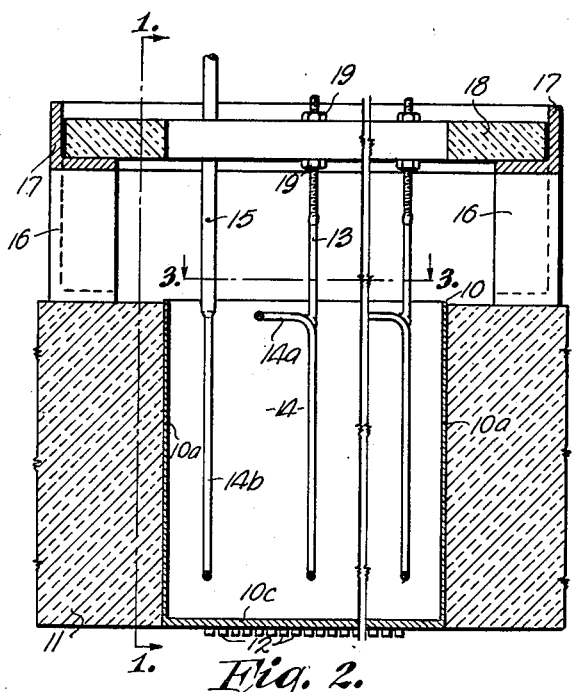

In the accompanying drawings which form a part of the specification and are to be read in conjunction therewith and in which like reference numerals are employed to represent like parts in the various views, Fig. 1 is a transverse vertical cross sectional view of an embodiment of the invention taken along the line 1—1 in Fig. 2 in the direction of the arrows.

Figure 3:
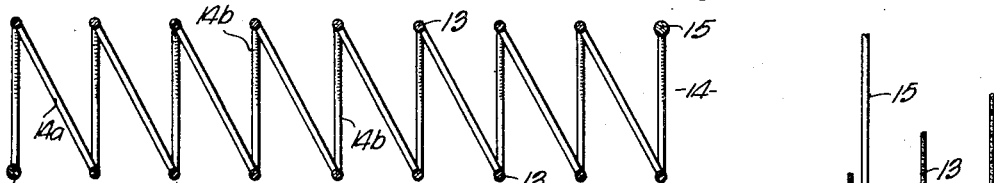
Figure 4:
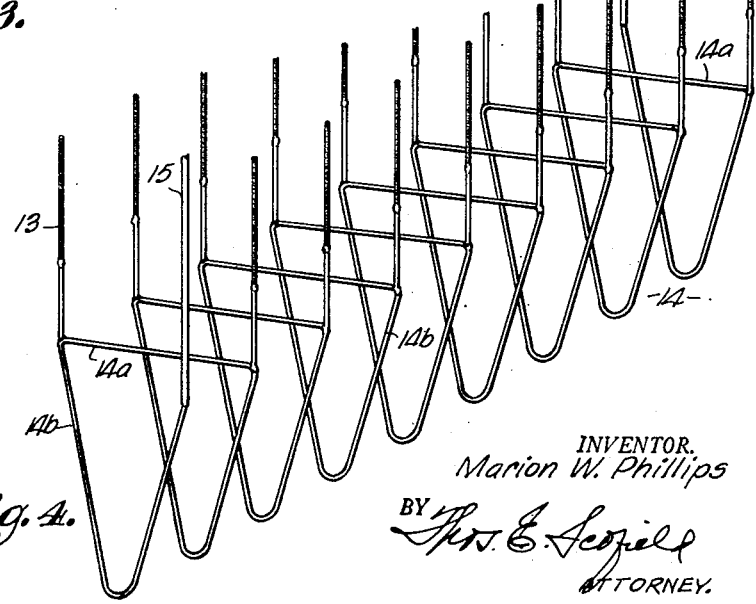
Figure 5:
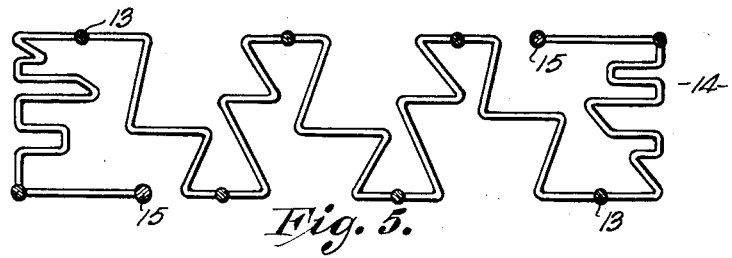
Figure 6:
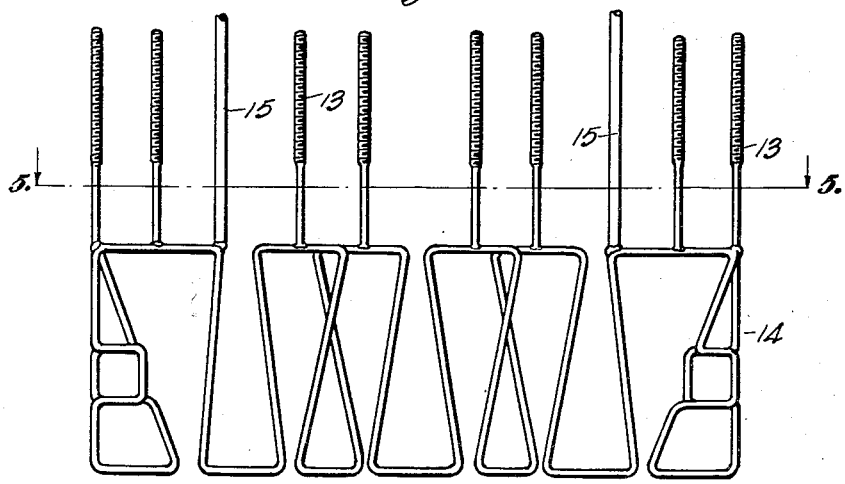
Figure 7:
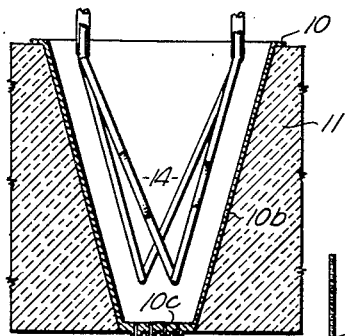
Figure 8:
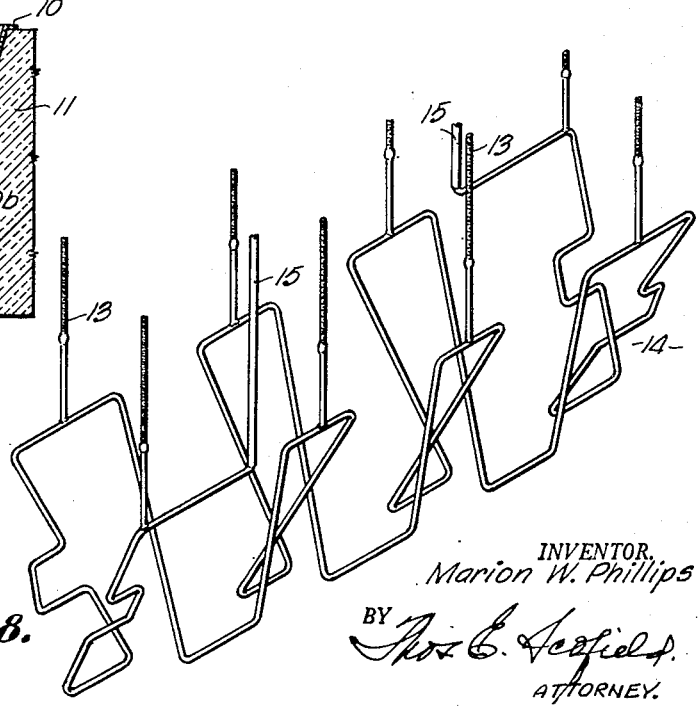

Fig. 2 is a longitudinal vertical cross section taken along the line 2—2 in Fig. 1 in the direction of the arrows, Fig. 3 is a plan view of the resistance element or immersion heater taken along the line 3—3 in Fig. 2 in the direction of the arrows, Fig. 4 is a perspective or isometric view of the heating element shown in the preceding figures removed from the bushing, Fig. 5 is a plan view of a modified type heater taken along the line 5—5 in Fig. 6 in the direction of the arrows, Fig. 6 is a side elevational view of the heater shown in Fig. 5, Fig. 7 is a transverse vertical cross section of a bushing with a modified type heater positioned therein, and Fig. 8 is a perspective or isometric view of the modified heater removed from the bushing.

Referring to the drawings the bushing or glass retort comprises a trough-shaped unit 10 supported in an insulated setting 11, with vertical end walls 10a, downwardly convering side walls 10b and a horizontal bottom 10c. In the bottom are a number of small orifices 12 arranged in longitudinal rows. Preferably the bushing is constructed of platinum which is relatively chemically inert to molten glass at high temperatures and is adapted to stand the intense heat necessary to melt the glass. The insulating material surrounding the bushing serves to minimize loss of heat from the molten glass body.

Suspended within the bushing upon a plurality of vertical hangers 13 is an immersion heater 14 of the grid type comprising a sinuous length of platinum alloy wire or rod shaped to the contour of the interior of the bushing to provide uniform heat throughout the glass body contained therein.

The preferred form of a grid heater is a helix of the shape shown in Figs. 1 to 4, inclusive; made of platinum or platinum alloy wire, this helix comprises a series of convolutions of modified triangular shape with their horizontal base portions 14a uppermost and the side portions 14b converging downwardly substantially parallel to the side walls 10b of the bushing. In the case of each convolution, the opposite sides 14b and the rounded return bend joining them together at the bottom, lie in a vertical plane normal to the longitudinal axis of the helix, forming what will be referred to hereinafter, for convenience, as the V portion of the convolution. Each base portion 14a extends diagonally from the upper extremity of one leg of a particular V to the upper extremity of the opposite leg of the next V, so these form cross-over connections which connect the V portions in series and complete the helix. The V portions are supported by the vertical hangers 13 at both ends of each diagonal cross-over connection 14a, and as may be appreciated from the drawings, each V portion is shaped (with due regard to the curvature of the return bend at the bottom and the angle of divergence of the opposite side portions 14b) to simulate a catenary suspended at its ends from these supports. The form of the heating element with the undulations lying in parallel planes and uniformly distributed throughout the body of the glass and equi-distant from the walls of the bushing is an important feature of the invention. Distribution of the heating element throughout the glass body by this simulated catenary arrangement maintains the grid heater in a fixed position within the bushing and is relatively unaffected by the intense heat required to melt the glass. Under such heat the wire or rod, were it not shaped and supported as shown, would have a tendency to be deformed and distorted as it loses its stiffness and sags under the high temperatures existing in melting the glass body. By shaping and supporting the element in the manner illustrated, however, there is little or no tendency for it to depart from its normal catenary form even though it loses stiffness due to the heat, and hence deformation is reduced to a minimum; also uniform heating of the molten glass throughout the body is obtained with considerably less electrical energy.

Welded to the ends of the heating element 14 are power lines 15 connected to a generator unit or other source of electrical supply not shown. Above the bushing and mounted on standards 16 is a rectangular angle support 17. Upon the horizontal flanges of the support rests a rectangular asbestos cement plate 18, which provides a support frame from which are suspended hangers 13 which support the grid. Through the opening in the center of the support glass stock may be introduced in any suitable manner to the bushing.

The suspension means or hangers 13 which support the grid within the bushing are preferably composite rods, their lower portions formed of platinum or platinum alloy, their upper portions of Monel metal, the separate portions welded together to form a unitary wire or rod structure. The lower or platinum ends of the hangers are welded directly to the grid. The upper or Monel metal portions are externally threaded to accommodate nuts 19 by which the rods are affixed to the asbestos plate 18.

Figs. 5, 6, 7 and 8 illustrate a modified type of construction of the immersion heater wherein the wire is bent into undulations and convolutions to form opposed grid sections lying substantially parallel to the sides of the bushing and converging at the bottom, probably shown best in Figs. 7 and 8. As before, the heater is a continuous sinuous wire or rod of platinum or platinum alloy hung at intervals along its top by equi-spaced hangers 13 and uniformly distributes the heat throughout the body of the molten glass. The spacing of the rod from its adjoining sections and from the bushing is carefully arranged to eliminate possibility of by-passing or short-circuiting the electric current therethrough. The zigzag convolutions at the ends of the modified type grid are shaped to carry the heat of the grid uniformly through the glass body at the ends of the bushing as well as along its sides. This is accomplished in the preferred form by the end triangular convolutions which lie relatively close and substantially parallel to the ends of the bushing, but in the modified form the shape of the heating element is such that zigzagging of the rod was further advantageous to proper heating of the extremities of the glass body.

In the modified type electrical power lines 15 similar to those described in connection with the preferred type heater are welded to its ends. Likewise, composite hangers of platinum, platinum alloy and Monel metal are used to support the grid and are threaded at the top in order that the hangers may be fastened to the rectangular support or frame 18 in the same manner as in the preferred form.

Either of the grid structures described are suspended in a bushing during use in a manner that the convolutions or loops of the element are so distributed throughout the bushing and glass body to supply heat uniformly when electric current is passed therethrough. Power lines 15 preferably connected to a source of 28 volt electricity and generating at least 200 to 220 amperes are used for heating the immersion heaters. Grid temperatures of the order of 1500° C. or sufficient to melt the glass contained in the bushing and maintain it in molten condition until it is drawn and attenuated through the orifices of the bushing is essential to proper operation. Thus, it will be apparent considerably less current is used in heating the glass body and difficulties attending the use of the bushing as a resistance heater are to a great extent eliminated. The use of low current values reduces expense of cables, switches, transformers and provides considerable economy in electric power used.

Furthermore, the addition of heat directly to the body of the glass batch greatly facilitates the removal of occluded gases reducing the amount of fiber breakage, also heat loss through the walls of the bushing.

From the foregoing it will be seen that the invention is well adapted to attain the ends and objects hereinbefore set forth together with other advantages which are obvious and which are inherent to the structure. It will be understood that certain features and subcombinations are of utility and may be employed without reference to other features and subcombinations and this is contemplated by and is within the scope of the claims.

Inasmuch as various modifications of the invention may be made without departing from the scope thereof, it should be understood that all matter hereinbefore set forth or shown in the accompanying drawings is to be interpreted as illustrative and not in a limiting sense.

Having thus described my invention, I claim:

1. An immersion heating element for melting and maintaining molten a batch of glass contained in an insulated vessel having a bottom wall provided with a plurality of restricted outlet orifices, comprising an elongate rod of resistance material having its opposite ends connected to a source of electrical potential, means supporting said rod in said vessel, the intermediate portion of said rod being sinuous and of such shape as to form an open three-dimensional frame the exterior envelope of which conforms with the interior shape of the vessel, said envelope being spaced inwardly from all walls of said vessel by substantially the same distance and each side of the envelope being substantially parallel to the confronting wall of the vessel.

2. An immersion heating element for melting and maintaining molten a batch of glass contained in an insulated vessel, having a bottom wall provided with a plurality of restricted outlet orifices comprising an elongate rod of resistance material disposed in said vessel with its opposite ends connected to a source of electrical potential, the intermediate portion of said rod being sinuous and of such shape as to form an open three-dimensional frame the exterior envelope of which conforms with the interior shape of the vessel, said envelope being spaced an equal distance inwardly from all walls of said vessel, and a second frame above said vessel having a plurality of parallel rows of hangers depending therefrom and secured to said open frame to support same, the hangers in each row being equispaced.

3. An immersion heating element for melting and maintaining molten a batch of glass contained in an insulated vessel, comprising an elongate rod of resistance material disposed in said vessel with its opposite ends connected to a source of electrical potential, the intermediate portion of said rod being sinuous and of such shape as to form an open frame, the exterior envelope of which conforms with the interior shape of the vessel, means supporting said frame so its envelope is spaced inwardly from all walls of said vessel, said last means including a second frame having a plurality of parallel rows of hangers depending therefrom and secured to said open frame, the hangers in each row being equi-spaced, each of said hangers comprising a pair of vertical rod sections disposed end to end and butt welded, the lower section being of the same material as said sinuous rod and the upper section being of a different material.

4. An immersion heating element for melting and maintaining molten a batch of glass contained in an insulated vessel, comprising an elongate rod of resistance material disposed in said vessel with its opposite ends connected to a source of electrical potential, the intermediate portion of said rod being sinuous in form with a recurring pattern along a predetermined horizontal axis, each recurrrence of said pattern comprising a section of said rod disposed partly on one side of a vertical plane passing through said axis and partly on the other side of said plane, and each of the latter parts extending both above and below said axis, said sinuous form of the rod contributing to the evenness with which the heat given off by the rod is distributed through the glass batch in the vessel, a support for said rod spaced above the vessel and having a plurality of parallel rows of hangers depending therefrom and secured to the upper parts of the sinuous rod, the hangers in each row being equispaced.

5. A heating element as in claim 4 wherein each of said hangers comprises a pair of vertical rod sections disposed end to end and butt welded, the lower section being of the same material as said sinuous rod and the upper section being of a different material.

6. An immersion heating element for melting and maintaining molten a batch of glass contained in an insulated vessel, having a bottom wall provided with a plurality of restricted outlet orifices, comprising an elongate rod of resistance material disposed in the vessel with its opposite ends connected to a source of electrical potential, the intermediate portion of said rod bent to form a plurality of upright V-shaped sections serially connected at their tops by horizontal sections of the rod, the successive V-shaped sections being disposed in different vertical planes which are parallel but spaced laterally at uniform intervals from one another, the opposite legs of each V-shaped section diverging upwardly and the corresponding legs of all V-shaped sections being in horizontal alignment, a frame above the vessel, and means supporting said bent resistance rod on said frame in dependent relation thereto, with the vertices of the V-shaped sections spaced above the bottom wall of the vessel, said means comprising a different pair of hangers for each V-shaped section of said rod, the hangers of each pair being secured to the opposite upper extremities of one V-shaped section.

7. An immersion heater as in claim 6 wherein each V-shaped section is pre-formed to simulate a catenary suspended at its ends from said hangers.

8. An immersion heating element for melting and maintaining molten a batch of glass contained in an insulated vessel, comprising an elongate rod of resistance material disposed in the vessel with its opposite ends connected to a source of electrical potential, the intermediate portion of said rod bent to form a coil the successive turns of which progress along a substantially horizontal axis and are spaced apart at substantially equal intervals, the side and bottom portions of said coil being spaced inwardly at a substantially equal distance from the sides and bottom of said vessel, a frame above said vessel, and hangers supporting said coil on said frame in dependent relation to the frame.

9. An immersion heating element for melting and maintaining molten a batch of glass contained in an insulated vessel, comprising an elongate rod of resistance material disposed in the vessel with its opposite ends connected to a source of electrical potential, the intermediate portion of said rod bent to form a coil the successive turns of which progress along a substantially horizontal axis and are spaced apart at substantially equal intervals, each turn of said coil comprising a V-shaped portion with a horizontal portion extending diagonally from the upper extremity of one leg thereof to the upper extremity of the opposite leg of the V-shaped portion of the next turn, a frame above said vessel, and hangers connected to the coil at the opposite upper extremities of each V-shaped portion supporting said coil on said frame in dependent relation to the frame with the vertices of the V-shaped portions spaced above the bottom of the vessel.

10. A heating element as in claim 9 wherein each of said V-shaped portions is pre-formed to simulate a catenary suspended at its ends from said hangers.

11. Apparatus for producing fibrous glass, comprising a trough-shaped vessel with closed ends for holding a batch of glass, said vessel having downwardly converging side walls and orifices in the bottom through which the glass may issue and be drawn into filaments, an immersion heating element in said vessel for melting the glass and maintaining same molten, said element comprising an elongate rod of resistance material having its opposite ends connected to a source of electrical potential, the intermediate portion of said rod being sinuous and of such shape as to form a three-dimensional open frame, the exterior envelope of which is spaced inwardly from but disposed substantially parallel to the side, end and bottom walls of said vessel.

12. Apparatus for producing fibrous glass comprising a trough-shaped vessel with closed ends for holding a batch of glass, said vessel having downwardly converging side walls and orifices in the bottom through which the glass may issue and be drawn into filaments, an immersion heating element in said vessel for melting the glass and maintaining same molten, said element comprising an elongate rod of resistance material having its opposite ends connected to a source of electrical potential, the intermediate portion of the rod being bent to form a plurality of V-shaped sections serially connected at their tops by horizontal sections of the rod, each V-shaped section being disposed in a vertical plane normal to the longitudinal axis of the trough and having its legs converging downwardly substantially parallel to the side walls of the trough, a frame above the trough, and means for supporting said bent resistance rod on the frame in dependent relation thereto with the vertices of the V-shaped portions spaced above the bottom of the vessel, said means comprising a pair of hangers for each V-shaped section of the rod, the hangers of each pair being secured at their lower ends to the opposite upper extremeties of one of said V-shaped sections.

13. A heating element as in claim 12 wherein each of said V-shaped sections is preformed to simulate a catenary suspended at its ends from said hangers.

14. An immersion heating element for melting and maintaining molten a batch of glass contained in an insulated vessel, comprising a rod-like resistance element formed with three dimensional convolutions, said element being supported in the glass containing portion of the vessel and the convolutions being in a longitudinally recurring pattern, the corresponding sections of adjoining convolutions being spaced equidistant from one another and also equidistant from the walls and above the bottom of the vessel to evenly distribute the element and heat therefrom throughout the batch of glass, and electrical connections attached to opposite ends of the element.

MARION W. PHILLIPS.

References Cited in the file of this patent

UNITED STATES PATENTS

| Number | Name | Date |
|---|---|---|
| 2,125,912 | George et al. | Aug. 9, 1938 |
| 2,227,357 | Martin | Dec. 31, 1940 |
| 2,235,352 | Bates | Mar. 18, 1941 |
| 2,335,135 | Staelin | Nov. 23, 1943 |
| 2,465,137 | Van Nordstrand | Mar. 22, 1949 |

FOREIGN PATENTS

| Number | Country | Date |
|---|---|---|
| 14,338 | France | Sept. 18, 1911 |
| 138,889 | Germany | Feb. 28, 1903 |
| 183,287 | Germany | Feb. 25, 1907 |
| 341,383 | Great Britain | Jan. 15, 1931 |
| 433,547 | Great Britain | Aug. 16, 1935 |
| 511,857 | Great Britain | Aug. 25, 1939 |
| 629,709 | Germany | May 9, 1936 |